United States Patent
Bicanic et al.

(10) Patent No.: US 8,786,662 B2
(45) Date of Patent: Jul. 22, 2014

(54) SUCCESSIVE REAL-TIME INTERACTIVE VIDEO SESSIONS

(76) Inventors: Nikola Vladimir Bicanic, Hermosa Beach, CA (US); Arben Kryeziu, Kahului, HI (US)

(*) Notice: Subject to any disclaimer, the term of this patent is extended or adjusted under 35 U.S.C. 154(b) by 217 days.

(21) Appl. No.: 13/572,637

(22) Filed: Aug. 11, 2012

(65) Prior Publication Data
US 2014/0043426 A1    Feb. 13, 2014

(51) Int. Cl.
*H04N 7/14*    (2006.01)

(52) U.S. Cl.
CPC ........................................ *H04N 7/14* (2013.01)
USPC .................. 348/14.02; 348/14.08; 348/14.11; 705/319

(58) Field of Classification Search
CPC ......... H04N 7/14; H04N 7/141; H04N 7/142; H04N 7/147; H04N 7/148; H04N 7/15; H04N 7/152; G06Q 50/01
USPC ..................... 348/14.01–14.16; 705/319, 1.1; 709/225
See application file for complete search history.

(56) References Cited

U.S. PATENT DOCUMENTS

| | | | |
|---|---|---|---|
| 6,704,403 B2 | 3/2004 | Lurie et al. | |
| 7,289,623 B2 | 10/2007 | Lurie | |
| 7,475,149 B2 | 1/2009 | Jacob et al. | |
| 7,725,398 B2 | 5/2010 | Dawson et al. | |
| 7,877,353 B2 | 1/2011 | Ahmed et al. | |
| 8,046,472 B2 | 10/2011 | Kumar | |
| 2002/0010608 A1 | 1/2002 | Faber et al. | |
| 2004/0125127 A1 | 7/2004 | Liu | |
| 2007/0032240 A1* | 2/2007 | Finnegan et al. | 455/445 |
| 2010/0145869 A1* | 6/2010 | Brown | 705/319 |
| 2013/0335509 A1* | 12/2013 | Cafferata | 348/14.08 |

FOREIGN PATENT DOCUMENTS

EP    1598760 A1    11/2005

* cited by examiner

*Primary Examiner* — Melur Ramakrishnaiah
(74) *Attorney, Agent, or Firm* — Joseph E. Root

(57) ABSTRACT

A method for initiating continuous succession of multiple real time interactive video sessions of a predetermined duration between two users among multiple users logged on to a server through a network. The method includes matching of a set of predetermined characteristics of a first user with a set of predetermined characteristics of other users, and identifying an appropriate second user for the first user to interact with. On identifying the second user, a real time interactive session of predetermined duration is initiated between the two users and the user accounts of the two users are debited by a predetermined amount of virtual currency. On identifying a swiping operation on the display screen in a predetermined manner, by any of the first and the second users, the method automatically terminates the current video session, and initiates a next video session for that user.

20 Claims, 16 Drawing Sheets

SUCCESSIVE REAL-TIME INTERACTIVE VIDEO SESSIONS

BACKGROUND

The present invention generally relates to interactive communication methods and systems, and, more specifically, to real time interactive video communication between different users connected to a server through a network.

Conventionally, many internet dating websites are available, where different users willing to interact with and eventually date, persons of genders matching their preferences, upload their profiles and determine suitable dating partners. Most conventional internet dating platforms employ a relatively common set of elementary protocols and steps to search for an appropriate dating match for a user, and to facilitate the user's interaction with other users. Dating websites, in general, require a user to create a profile by providing a set of details, including age, gender, appearance, hobbies, interests, etc. It often takes quite some time for a user to create a profile. Also, the profile may not actually represent the user's virtues. There are many users who provide false information with the intent of attracting more people. Many users lose interest in particular dating websites after repeatedly encountering fake profiles. For example, during uploading their profile pictures on dating platforms, some users provide fake pictures.

Further, viewing a user's static image during interacting with him/her is tedious. Some of the dating websites facilitate uploading a pre-recorded video file into a profile, but, even that measure may not provide a true representation of someone's personality, appearance, energy, etc. During most of the verbal or audio communications between different users on the conventional dating websites, it often takes hours for two people to interact and identify each other, before they could actually take a decision for a real time interaction.

Another important concern of such dating platforms is the increasing number of sexual predators, which who falsify profiles merely to poach sexual partners. Some persons indulge in nudity and initiating sexual verbiage, which may be offensive and annoying to the other party. Generally, there are no options on many dating websites for a user to prevent or block such users from interacting with him/her in future, or to ban them from logging on to the website next time, or, to automatically delete their profiles by annulling their registration.

Considering the aforementioned problems, a need exists for a better interactive platform for facilitating interaction and communication between different users, a platform which may substantially increase the users' interest and trust, and the platform's credibility.

SUMMARY

The present disclosure provides an extremely congenial and effective dating platform for different users to find their desired matches quickly, and fix real dates. Further, the dating platform provides an enjoyable and satisfactory dating experience by facilitating real-time interactive video sessions between users.

In one aspect, the present disclosure provides a method for facilitating a succession of multiple real time interactive video sessions of a predetermined duration between two or more users among a plurality of users. In the method, a first user logs on to a server through a network, using a first electronic communication device. The server matches a set of predetermined characteristics of the first user with a set of predetermined characteristics of one or more of the other users. The server then performs a search to determine an appropriate second user that the first user can interact with. The searched second user uses a second electronic communication device to log on to the server through the network. Then, the first user initiates a real time interactive video session of the predetermined duration with the second user. Once the session is initiated, a common time indicator is rendered on the display screens of each of the first and the second electronic communication devices. The common time indicator continuously indicates the time left before the video session terminates. Further, a separate virtual currency indicator is rendered on the display screens of each of the first and the second electronic communication devices. The virtual currency indicator on each device shows a current amount of virtual currency remaining in a user account associated with the user of the device. Further, on interpreting a predetermined gesture of one of the first user and the second user, the method may terminate the current video session between the first user and the second user and initiate a new successive session for the first user, the second user, or both. Else, the method may also extend the duration of the current video session between the first user and the second user, beyond the predetermined duration. Further, the method deducts a predetermined amount of virtual currency from the user account of the first user or the second user, based on whether the predetermined gesture is posed by the first user or the second user, respectively. The predetermined gesture is a swiping operation, a clicking operation or a tapping operation performed on the display screen of any of the first and the second electronic communication devices.

In another aspect, the present disclosure provides an apparatus for facilitating a continuous succession of multiple real time interactive video sessions of a predetermined duration between two or more user among a plurality of users connected to a server through a network. The apparatus includes a first electronic communication device logged on to the server through the network. The first electronic communication device is configured to send a request to the server for initiating a real time interactive video session. The server is configured to identify an appropriate user using a second electronic communication device, and logged on to the server through the network, for the first user to interact with. On identification of the second user, the system facilitates communication of the first and the second electronic communication device through a video session. The two devices have touch-sensitive display screens to obtain user inputs, and communicate with each other during the real time interactive video session. During the session, the display screen on each device renders different user selectable options to transmit inputs received from a user of one of the two devices, to a user of the other device. Such user selectable options include an option to terminate the current video session, an option to request a prospective meeting session, an option to request a next prospective video session, or an option to report an inappropriate conduct during the video session. Further, a separate virtual currency indicator is rendered on the display screen of each of the first and the second electronic communication devices. The virtual currency indicator on each device represents a current amount of virtual currency remaining in the user account associated the user of that device. Also, a common time indicator is rendered on the display screens of the two devices, representing the amount of time left before the current video session will terminate automatically. The display screens of each of the first and the second electronic communication devices can also interpret a swiping, clicking or tapping operation, and in consequence to the operation, the apparatus terminates the current video session and initiates a next video session for the user of any of the first and the second electronic communication devices.

The method and the apparatus of the present disclosure, for facilitating a real time interactive video session between users, is extremely congenial and provides an enhanced user experience during dating, by providing real time video images of the users during the video session. Further, the method substantially reduces the time consumed in finding an appropriate dating match, and does not require the user to waste minutes in creating his/her profile.

Additional aspects, advantages, features and objects of the present disclosure would be made apparent from the drawings and the detailed description of the illustrative embodiments construed in conjunction with the appended claims that follow.

DETAILED DESCRIPTION OF ILLUSTRATIVE EMBODIMENTS

The following detailed description discloses aspects of the claimed invention and the ways it can be implemented. However, the description is not intended to define or limit the invention, such definition or limitation being solely contained in the claims appended thereto. Although the best mode of carrying out the invention has been disclosed comprehensively, those in the art would recognize that other embodiments for carrying out or practicing the invention are also possible.

The present disclosure unveils a highly interactive system and method for facilitating real time interactive video sessions between two or more users, among multiple users connected to a server through a network. The method continuously renders real time video images of the users during their interaction, and hence, enhances the users' experiences. Further, the method avoids the need for users to create and upload their profiles before they can be eligible for interacting through video sessions. Further, during the video sessions, obscenity is substantially avoided by providing an option for the users to report any forbidden inappropriate act performed by another user, and in such a case, the registration of the user indulged in the act can be permanently cancelled, thus, preventing that user from logging on in future.

Figure 1:
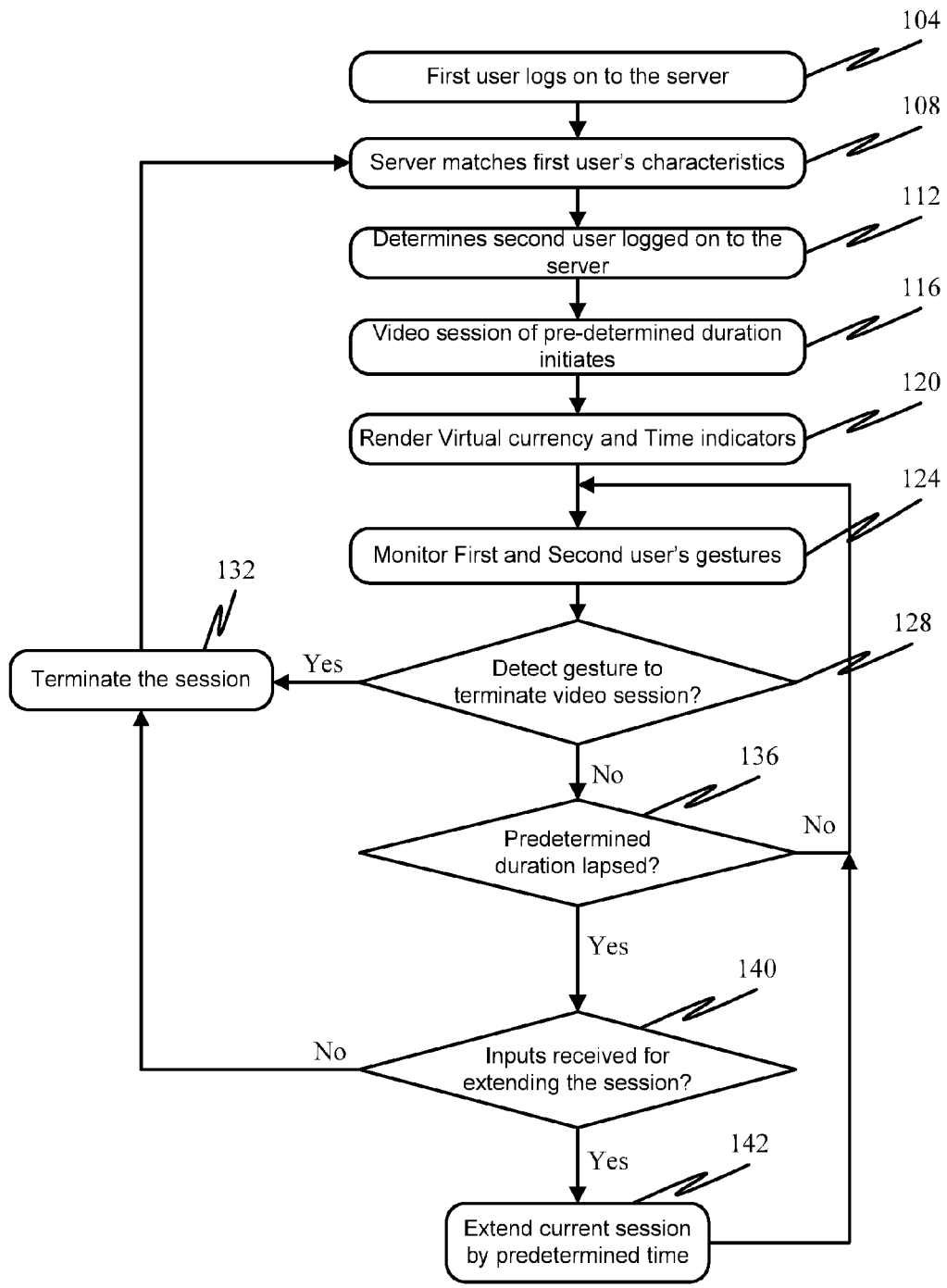
FIG. 1 illustrates a method for facilitating a real time interactive video session between two or more users, in accordance with the present disclosure.

FIG. 1 shows a method for conducting a succession of multiple interactive video sessions between two users among multiple users connected to a dating server through a network. The method is specifically explained with reference to a case where it pertains to an online real time video dating between two users, however, the current example of a video dating environment should not be construed as a limitation to the scope of the present disclosure, and the method may find its application in other environments as well, where a real time interactive video session between two or more users may be desired. Another application of the method for conducting a succession of multiple interactive video sessions is for conducting interviews at job fairs, where multiple recruiters visit to interview multiple candidates at one location. The method for conducting a succession of multiple interactive video sessions may be used by recruiters to interview candidates at the job fair.

At step 104, a first user logs on to a dating server through a network, using a first electronic communication device. The dating server is set up by a dating service provider. If the first user is using the dating platform for the first time, he/she is not required to create his/her profile by providing a user name, setting a password, and providing other personal details. The user may use login details, which include user name and password, of his/her social networking platform to log into the dating server. Possible social networking platforms for this purpose include but is not limited to Facebook®, LinkedIn®, Google+®, Ning®, Twitter®, MySpace® and Orkut®, as well as other social networking platforms now known or hereafter developed. The dating server employs an Application Programming Interface (API) provided by the social networking platform to enable the user to login to the dating server using login details of the user account on the social networking platform. Further, the API allows the dating server to obtain the predetermined characteristics of the first user from that user's user account on the social networking platform. The predetermined characteristics of the first user include the user's gender, preferences, and hobbies.

When the first user logs in to the dating service, multiple other users are also logged on and are capable of connecting with each other. In an embodiment of the present disclosure, many users logged on to the dating server when the first user logs on are using smart communication devices based on mobile operating systems such iOS®, Android®, BlackBerry OS®, and the like. Further, these users logged on to the server using an application installed on their smart communication device, applications such as an iPhone® application, iPad® application, Android® application, or similar apps. Typically, the display screens of the devices, used by the first user and the second user, respectively, are touch-screens, capable of interpreting a touching, swiping or tapping operation performed on the screen.

At a step 108, the method matches a set of predetermined characteristics of the first user with a set of predetermined characteristics of the other users connected to the dating server. In an embodiment, the first user sends a request to the dating server to determine an appropriate user for a real time video session. The process to send a request is explained in further detail in conjunction with FIG. 2 below. The predetermined characteristics of the first user may include, for example, gender, preferences, and hobbies. Such characteristics of the first user may be obtained by the dating server using the API as noted above. The predetermined characteristics of each other user connected to the dating server are stored in a database at the dating server. In an embodiment, a community rating is given to each user by the other users. The community rating of the dating service users is gradually updated over time, as each user interacts with other users. Further, during matching for a suitable user, the server takes the community rating of that user into account. The dating server performs a search within its database to determine an appropriate second user for the first user to interact with at a step 112, the second user being logged on to the dating server using a second electronic communication device.

Once the appropriate second user is found, the video session for the predetermined duration between the first user and the second user is initiated at a step 116. In an embodiment, the predetermined duration of the video session is about 90 seconds. However, the duration may vary and is not intended to limit the scope of the disclosure. In another embodiment, the dating server sends the contact information of the second user to the first electronic communication device, which then initiates a real time video session with the second electronic communication device. As the session is initiated, a real time video image of the first user is continually rendered on the display screen of the second electronic communication device during the entire session, and vice versa. Exchanging actual video images enhances the experience of the two users during their interaction, as well as making the session more realistic and lively.

The community rating may be provided during the video session by performing a predetermined gesture on the two electronic communication devices. In an embodiment, the predetermined gesture includes using user selectable options rendered on the display screens of the two electronic communication devices. In an exemplary embodiment (see FIG. 5 below), a 'thumbs up' option on the graphical user interface of the devices, which when selected/clicked/tapped, leads to sending a certain message, for example, 'She thinks you are hot', on the other's screen. Similarly if a 'thumbs down' option is rendered, the system may provide another message, 'She is not interested'. The number of 'thumbs up' and 'thumbs down' messages that a user receives may be used to obtain a community rating for the user. In an embodiment, the community rating is provided during the video session using socket based metadata peer-to-peer transmission system. When the first user selects one of the 'thumbs up' or 'thumbs down' options, then that information is embedded in the video signal at the first electronic communication device; the second electronic communication device retrieves the embedded information, and displays one of 'She thinks you are hot' and 'She is not interested', respectively.

At a step 120, a separate virtual currency indicator is rendered on the display screens of the first and the second electronic communication devices, during the video session. Specifically, a user account is associated with each of the multiple users connected to the dating server and using the dating service. The user account (see FIG. 14 below) of each user contains a specific amount of virtual currency (denoted by 'fliks'), which is continuously updated as a user's time on the dating service. The virtual currency indicators rendered on the display screens of the devices of the first and the second user, continuously display the amount of virtual currency (fliks) remaining in their user accounts. The user accounts of the first user and the second user are debited by a predetermined amount of virtual currency, when a real time interactive video session is initiated between the two users. In an embodiment, each specific dating video session, running for the predetermined duration (for example, 90 seconds), costs one flik to a user. At the step 116, when the real time video session is initiated between the first user and the second user, the user accounts of the first user and the second user are debited by a predetermined amount of virtual currency and accordingly the virtual currency indicators rendered on the first and the second electronic communication devices show updated information at the step 120. In another embodiment, this amount is levied on the account of the user that initiates the video session with the other. For example, in the present case, one flik is immediately debited to the account of the first user, on initiation of the video session with the second user. However, the second user is not charged with any fliks.

Moreover, the user account associated with each user is updated and refilled with a specific predetermined amount of virtual currency, i.e., fliks, periodically. In an exemplary embodiment, each user's account is refilled with free 25 fliks of virtual currency every midnight. Again, the amount of free recharge periodically may be different in certain embodiments. If a specific user uses all the free 25 fliks during a specific day, he/she can refill the user account by purchasing the fliks by paying actual currency. In an exemplary embodiment, a $1 is required to recharge the account with 25 fliks. The user has an option to pay online through a suitable payment mode, including PayPal, credit card and debit card. Specifically, if the user consumes all the fliks in his/her account, a message may be rendered on the display screen of his/her device, for example, "Sorry, you ran out of fliks, need to refill?". Preferably, there is no limitation on the amount of fliks that a user can purchase.

In an embodiment, at the same step 120, a common time indicator is also rendered on the display screens of the first and the second electronic communication devices, as the first and the second user continue interacting during the video session. The common time indicator continuously indicates the remaining time for the current video session. This keeps the two users updated, and allows the users to extend the current video session in time, if required.

Continuing the method disclosed in FIG. 1, at a step 124, the method continuously monitors to detect and interpret any predetermined gestures or inputs from any of the first user and the second user on the first and the second electronic communication devices respectively. The predetermined gestures include selecting/clicking/tapping the user selectable options rendered on the display screens of the two electronic communication devices. The predetermined gestures also include swiping gestures on the touch screen of the two electronic communication devices. In an embodiment, the first user terminates the current video session by performing a swiping gesture on the first electronic communication device in a predetermined manner, such as performing a swiping operation from left to right on the touch screen or swiping from top to bottom or right to left. The method detects this operation at step 128. As soon as the first user performs this operation, the current video session is terminated at step 132 and the method goes back to step 108. Immediately, the dating server starts matching the predetermined characteristics of the first user with the predetermined characteristics of other users in the plurality of users to determine a third user for real time video session with the first user at step 108. Similar steps are followed for the second user.

If at the step 128 the method does not detect the predetermined gesture to terminate the current video session, the method continuously continues checking whether the predetermined duration of the video session has lapsed at step 136. If the duration has not lapsed, then the current video session continues and the method loops back to step 124. Otherwise, if the predetermined duration lapses, then at step 140, the method checks whether any input for extending the current session has been received from the first user or the second user. In an embodiment, when the predetermined duration is about to finish, a message is displayed on the display screens of the two devices, asking them to extend the current session. For example, a suitable message may be "Do you want to continue the current session?" The users may extend the duration of the current video session by performing a predetermined gesture on their electronic communication device. The predetermined gesture is explained in further detail in conjunction with FIG. 2 below. If neither the first nor the second user elects to extend the current video session, then the method terminates the current video session at the step 132. After terminating the session, the method returns to step 108. If an input to extend the current session is received from either the first or the second user, then the method extends the current video session by the predetermined time (e.g., 90 seconds) at step 142, and the method loops back to step 124. If the session is extended, a predetermined amount of virtual currency (i.e., 1 flik) is deducted from the account of the user requesting to extend the video session and the duration of the session is extended by a predetermined duration (i.e., another 90 seconds) and the method goes back to step 124. In that event, the other user can enjoy the extended session for no charge. This feature allows for digital chivalry to be displayed by the participants in a video session.

Certain other user selectable options are rendered during the video session. One user selectable option may provide an option to request a date, while another option may provide the ability to report inappropriate conduct (see FIGS. 10 and 12 below). The first user may request a date with the second user during the video session, and if the second user accepts, then the first user's account is debited with a predetermined number of fliks. This is explained in further detail in conjunction with FIGS. 7, 8, 9, 10, 13 and 14 below.

Another essential and powerful user selectable option is the ability to report inappropriate conduct by the other user. Such conduct may be set out in system rules, as, for example, "Forbidden Actions," which could include indulging in nudity or exposing himself/herself inappropriately. This option is known as 'perv-alert'. This is explained in further detail in conjunction with FIGS. 10 and 12 below.

FIGS. 2 to 15 illustrate the screenshots seen by first and the second users, as they initiate and carry on a real time interactive video session. Following the succession of these figures, one can view various features of the dating platform that enhance the users' experiences during the video sessions.

Figure 2:
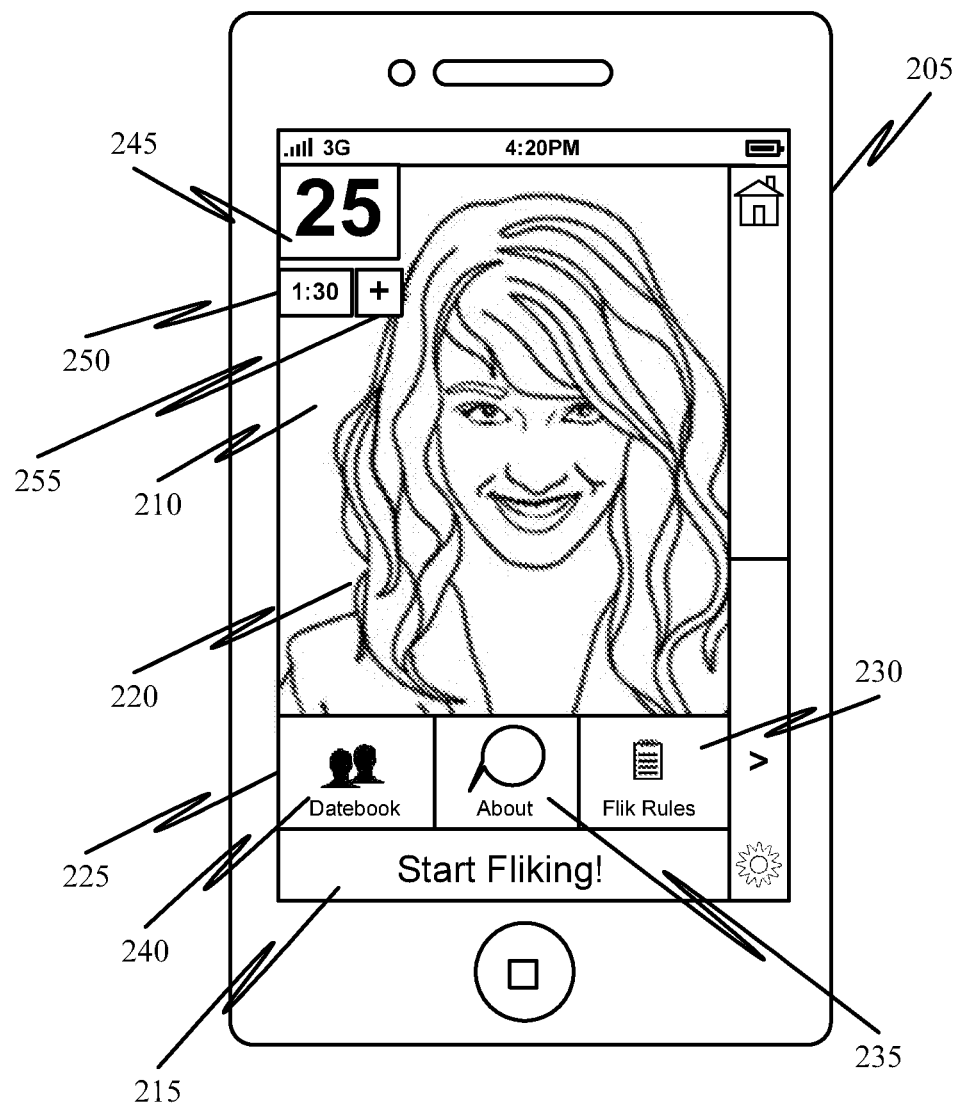
FIGS. 2-15 are screenshots of the electronic communication device of a user, as the user interacts with other users during real time interactive video sessions, and explores different features of the video dating platform, in accordance with the present disclosure.

FIG. 2 is a screenshot of the first electronic communication device 205, as the first user logs on to the dating server through the network and attempts to initiate a real time interactive video session with a second user, in accordance with the present disclosure. The graphical user interface pertaining to the dating platform is rendered on a display screen 210 of the electronic communication device 205. The first user uses a 'Start Fliking!' option 215 to send a request to the dating server to determine an appropriate user for a real time video session. As the dating server finds an appropriate second user for the first user, the real time video image 220 of the second user is rendered on the display screen 210 of the first electronic communication device 205. A panel 225 showing different informative options appear at the bottom of the display screen 210 as the video dating session starts. The panel 225 assists new users to get acquainted with the basic rules of the dating platform. For example, an option 230 called 'Flik Rules' may be selected to display the important rules to be followed during interaction with users. This measure is explained in further detail in conjunction with FIG. 3 below. Two more options, specifically the 'about' option 235 and a 'Datebook' option 240 appear on the panel 225. The 'about' option 235 sends the user to an interface disclosing the advantages and features of the dating platform. The 'Datebook' option 240 facilitates live chat session with the users selected by the first user during previous video sessions. This screen is explained in detail in conjunction with FIGS. 7, 8, 9, 10, 13 and 14 below. A virtual currency indicator 245, as noted earlier, is rendered on the display screen 210, indicating the amount of fliks (i.e., the amount of virtual currency) remaining in the first user's account. A similar virtual currency indicator is also rendered on the display screen of the second user 220, during the video session. Further, a common time indicator 250 is also continually rendered on the display screens of the devices of each of the first and the second user.

The time indicator continuously displays the remaining time for the current video session. A plus sign 255 is rendered on the display screens of the devices and allows both first and second user to extend the duration of the current session.

Figure 3:
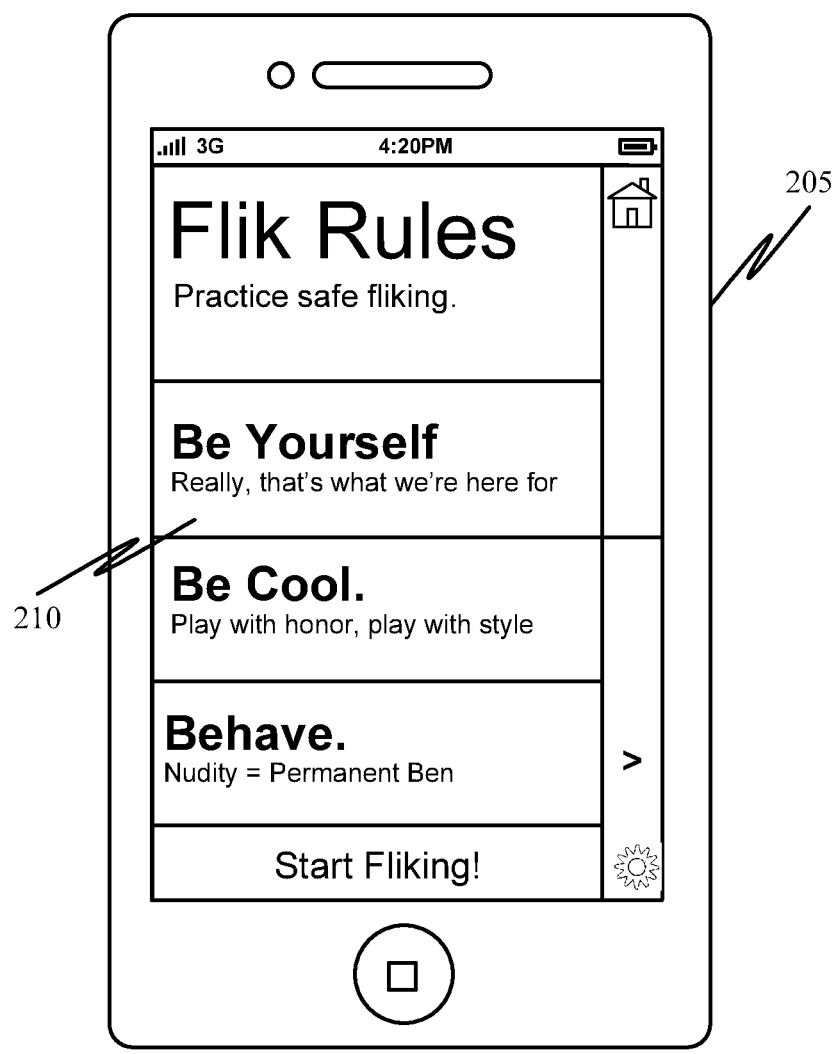

FIG. 3 is a screenshot of the display screen 210 of the first electronic communication device 205, when the option 'Flik Rules', as shown in FIG. 1 is selected by the user. The different rules appearing on the display screen 210 may include, for example, "Behave: Nudity—Permanent Ban" to make the user aware of the consequences of inappropriate exposure, etc. Another message, as shown, may be 'Be yourself', 'Be cool', etc. Such initial messages underlying the 'FlikRules' tab, are predetermined, and can be changed at the discretion of the administering authority for the dating platform.

Figure 4:
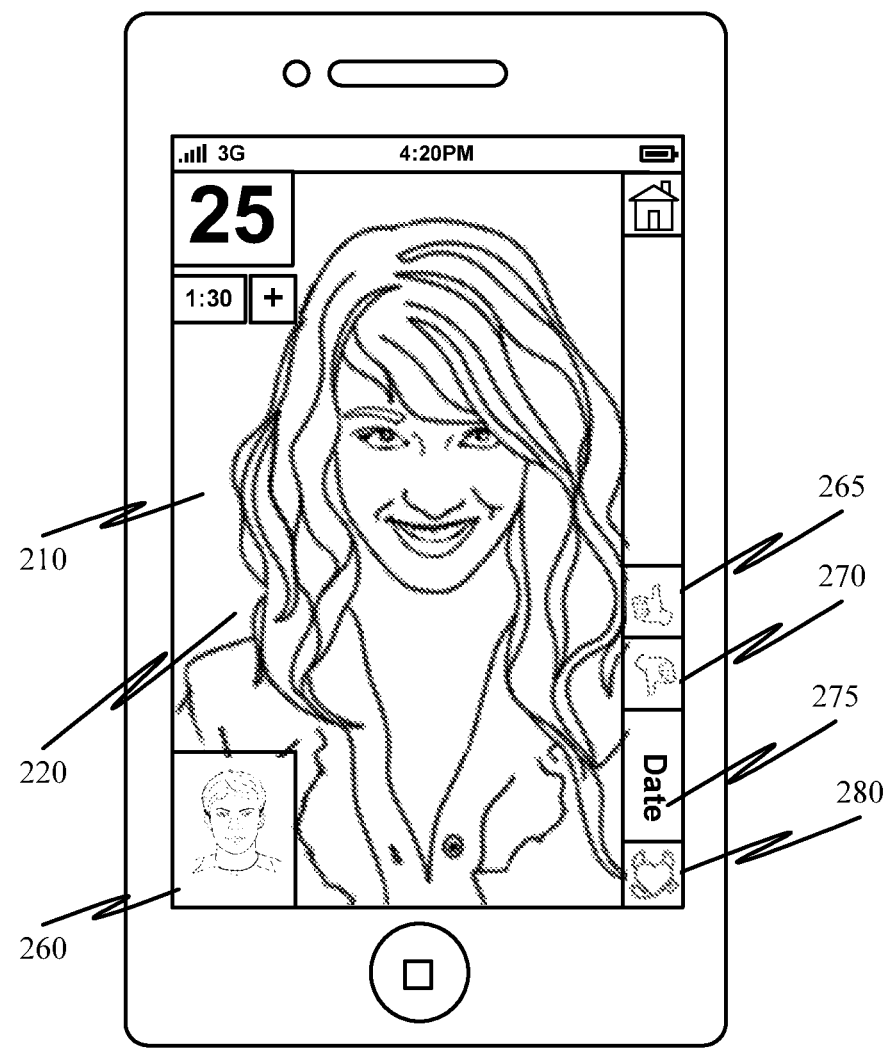

FIG. 4 shows another screenshot of the display screen 210 when the first user is in the middle of conversation with the second user 220. A shortened video image 260 of the first user also appears on the first electronic communication device as the first user interacts with the second user. On the right side of the display screen 210, a panel containing different user selectable options appears, to facilitate expression of different emotions, such as, liking or disliking the other user. As shown, a 'thumbs up' option 265 (liking option), a 'thumbs down' option 270 (disliking option), and a 'dating option' 275 appear. Further, an option the option known as 'perv-alert' 280 is also rendered, to enable the first user to report inappropriate behavior by the second user. During the video session, the panel containing such user selectable options is simultaneously displayed on the display screens of electronic communication devices of both the users involved in the video session, to facilitate the transmission of any inputs from one user to the other. In an embodiment, the first and second electronic communication devices have touch sensitive display screens and the users may terminate the current video session by performing a swiping gesture on the screen.

Figure 5:
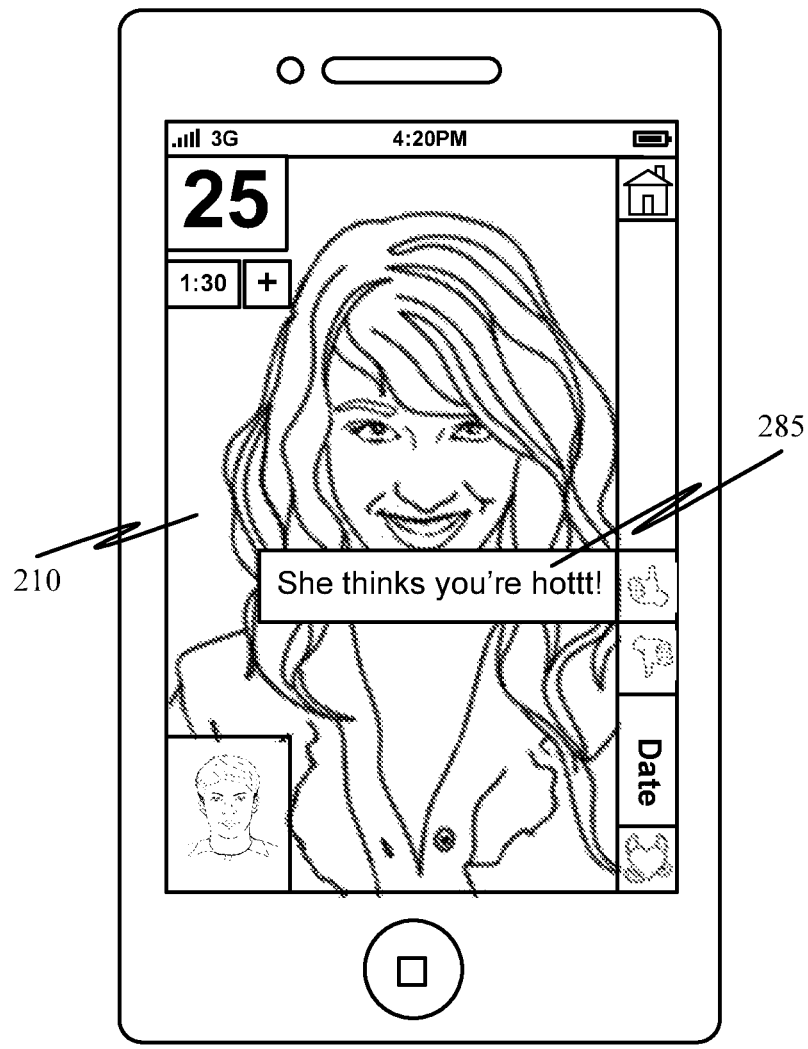

FIG. 5 illustrates the message appearing on the first user's display screen 210 s the second user selects the 'thumbs up' option on her device. As shown, a message "She thinks you are hot" 285 appears on the display screen 210. A similar message may appear on the display screen of the second user, which may be "He thinks you are pretty", if the first user selects the 'thumbs up' option on his device.

Figure 6:
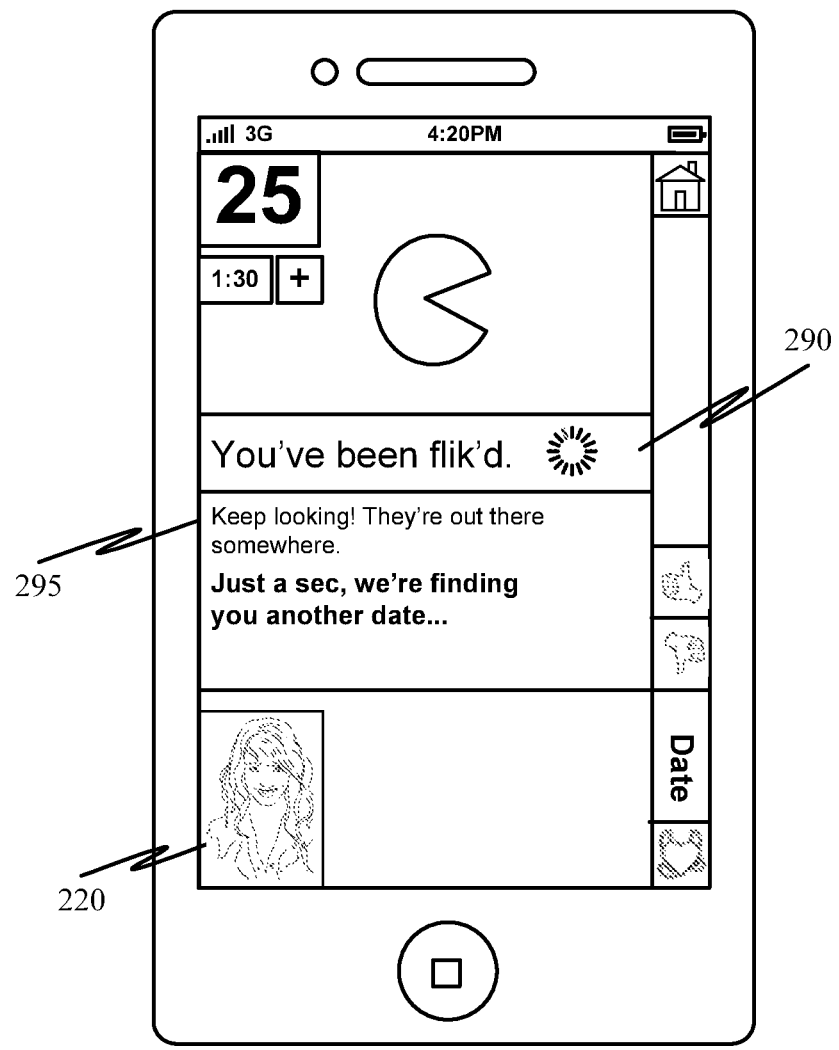

FIG. 6 is a screenshot of the second user's display screen when the first user has performed a swipe gesture on the touch sensitive display screen to terminate the current video session. Immediately, the second user 220 gets a message: "You have been fliked" 290. Further, other motivational phrases, like "Keep looking!" 295 may also be rendered on the display screen of the user which has been fliked.

Figure 7:
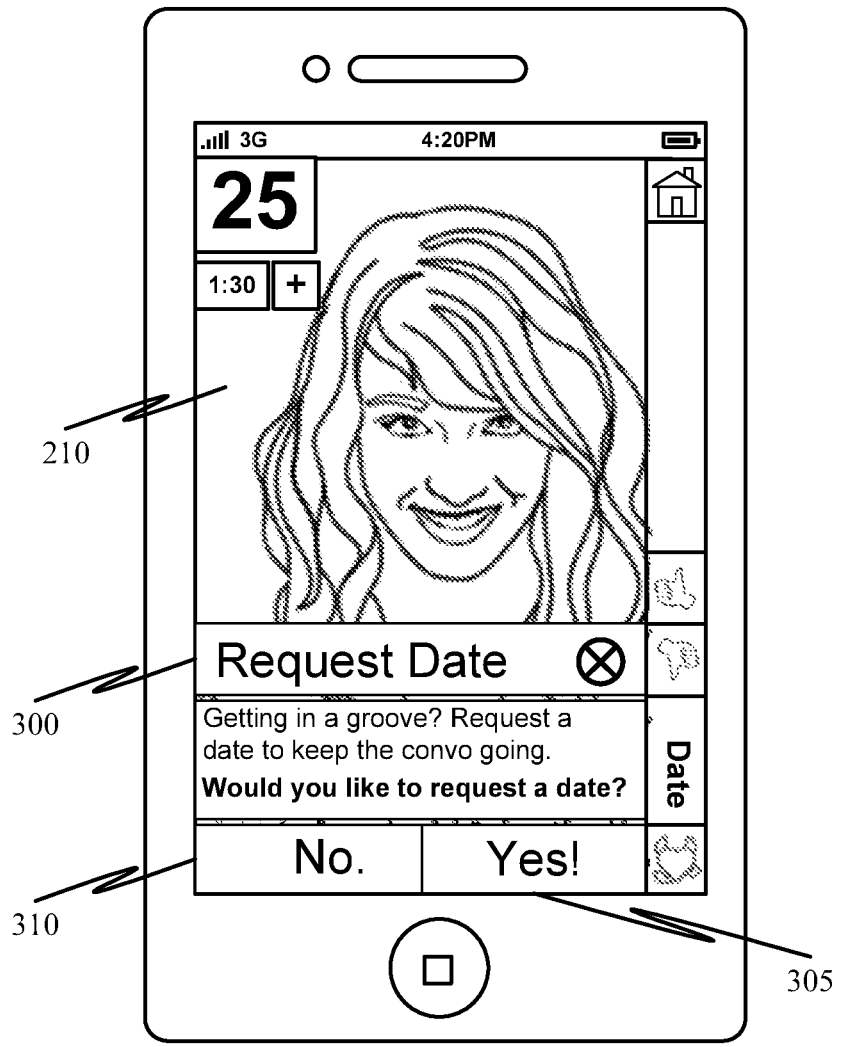

Alternatively, as shown at FIG. 7, the first user may employ the 'dating option' 275. Immediately, the first user receives a confirmation message 300: "Request date. Getting in groove? Request a date to keep the convo going. Would you like to request a date?" The first user may confirm the request for date by selecting "Yes" option 305 or the first user may rejected the request for date by selecting "No" option 310.

Figure 8:
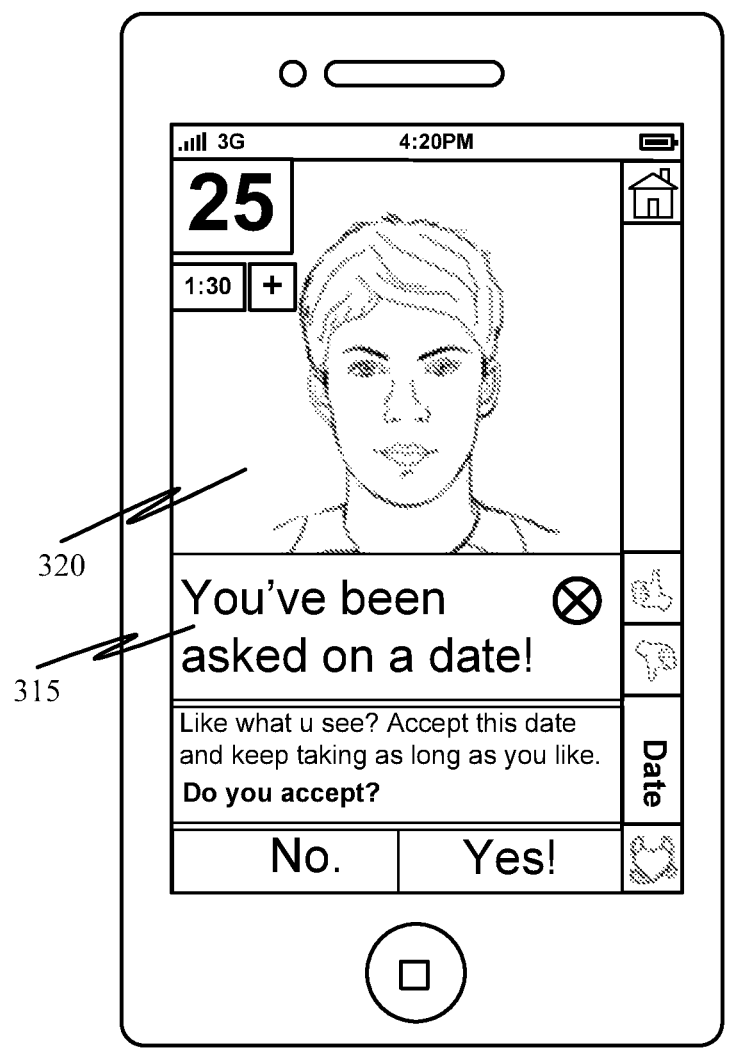
Figure 9:
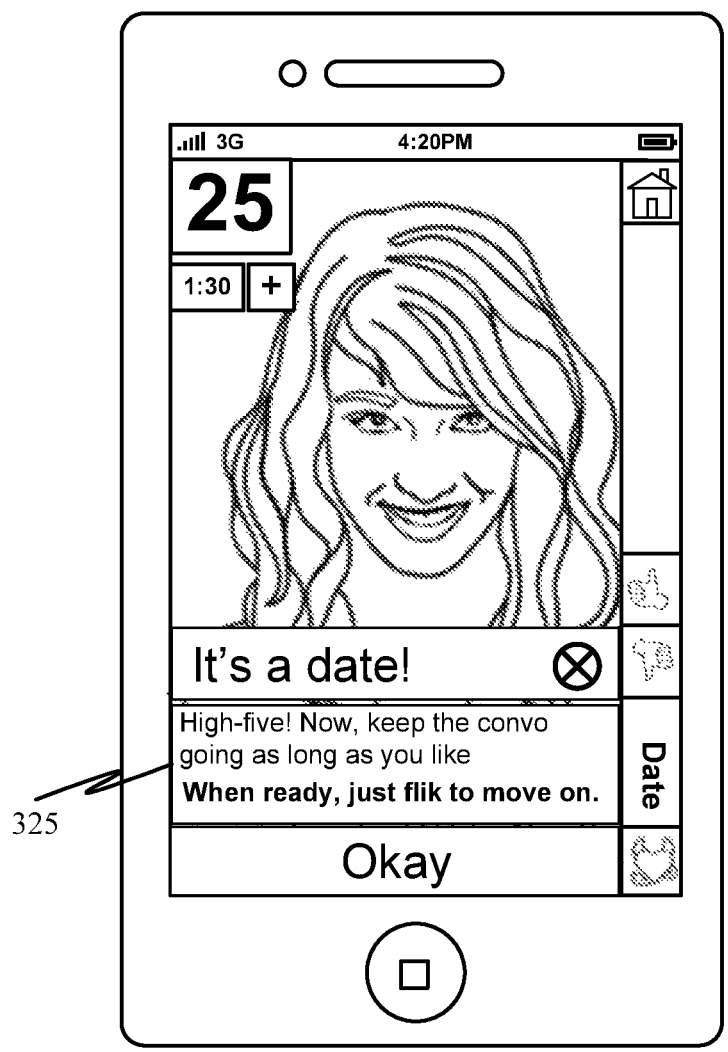

As shown in FIG. 8, if the first user confirms the request for a date, the second user receives the message 315: "You've been asked on a date!" on her display screen 320. The second user may or may not accept the date. If the second user accepts the date, the first user is notified through a message 325 (for example, "It's a date") as shown in FIG. 9. Also, the current video session is extended by a predetermined duration. Once the second user accepts the date, a predetermined number of fliks are deducted from the user account of the first user. In an exemplary embodiment, 5 fliks are deducted from the user account of the second user. Further, once the date is accepted, both the users are added to each other's 'Datebook'. The 'Datebook' feature is explained in further detail in conjunction with FIG. 12 and FIG. 13 below.

Figure 10:
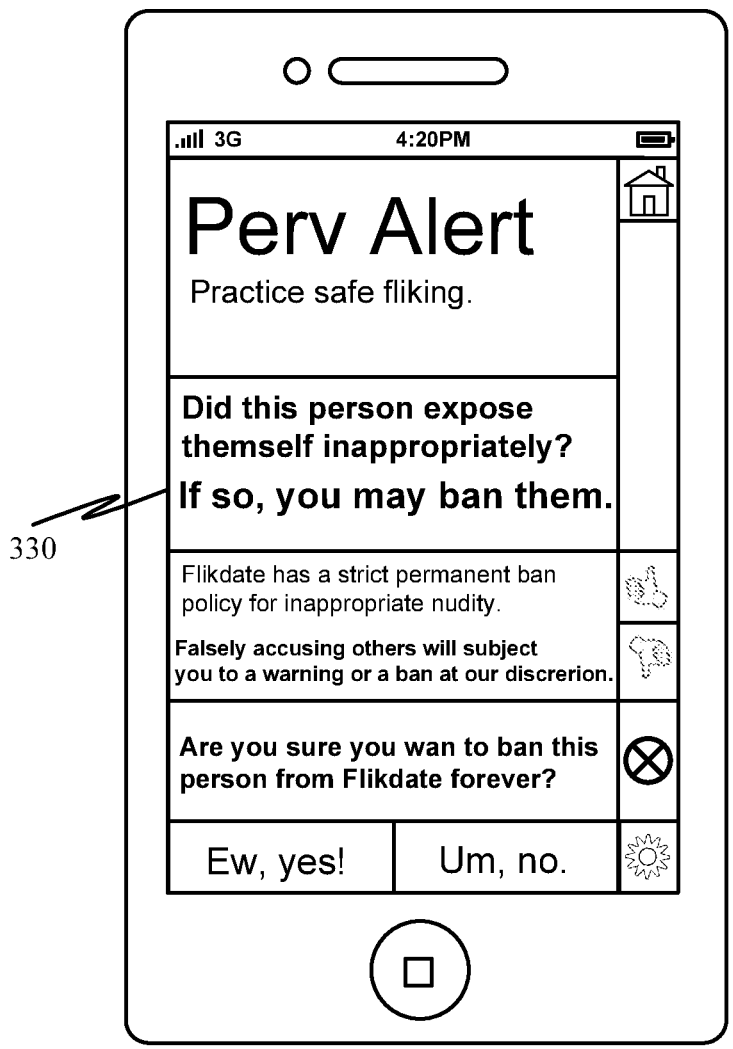
Figure 11:
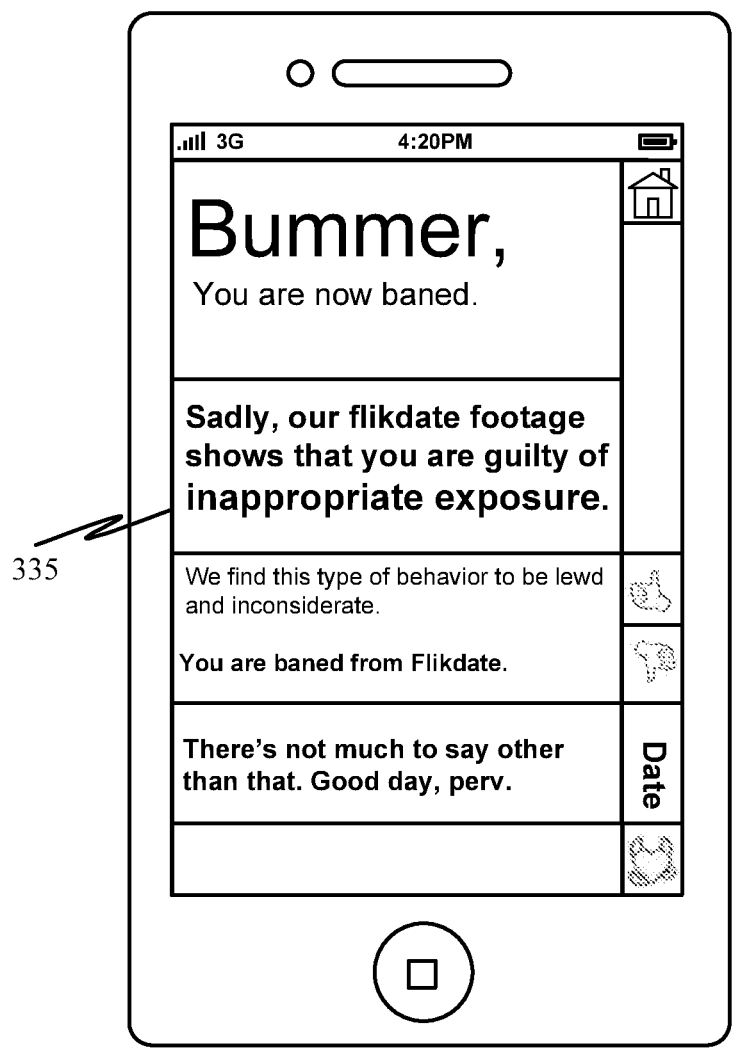

FIGS. 10 and 11 show screenshots after a user activates the 'perv-alert' option 280 for reporting inappropriate activity. As shown in FIG. 10, on selecting the 'perv-alert' option, a first user is asked for confirmation, before the second user is temporarily banned from the dating platform. Such a message 330 may include, as shown, "Did this user act inappropriately?", "Would you like to ban this user?" etc. On receiving the confirmation from the first user, the second user is immediately temporarily banned from accessing the dating platform. Further, whenever a 'perv-alert' is initiated by a user, a screenshot of the display screen of the accusing user is immediately taken by the dating server and based on a manual analysis of the screenshot by the dating service provider, an appropriate decision is taken as to whether to permanently ban the second user or not. In an embodiment, the screenshot is taken by the device of the first user and sent to the dating server. However, in case the first user is found to have wrongly accused the second user, the first user is warned and may be banned if repeated wrong accusations are detected. If banning the second user is required, the dating server bans the second electronic communication device of the second user. The dating server may ban the electronic communication device based on the Media Access Control (MAC) address of the electronic communication device. Moreover, the dating server bans the user account on the social networking platform, that the second user used to login to the dating server.

FIG. 11 shows a screenshot of the display screen of a banned user, notifying him/her of being banned. After receiving that message, the user will be unable to access the dating platform in the future. A message 335 may include, as shown, "Sadly, our flikdate footage shows that you are guilty of inappropriate exposure. You are banned from flikdate".

Figure 12:
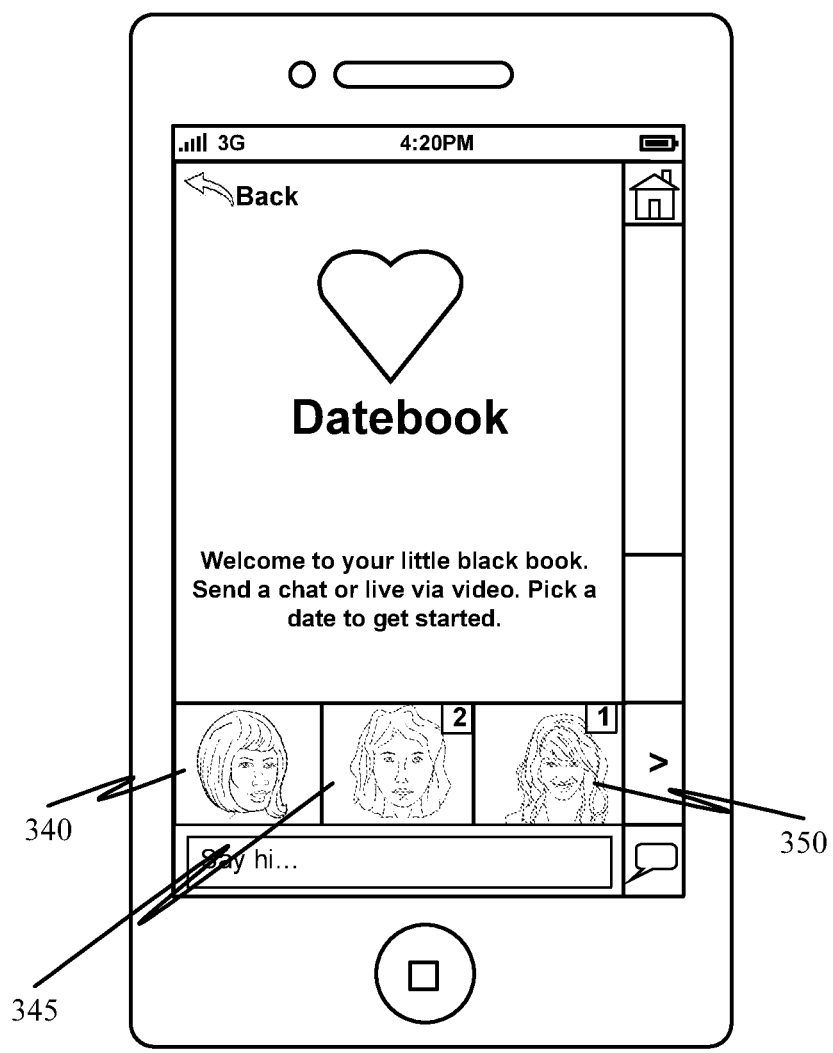
Figure 13:
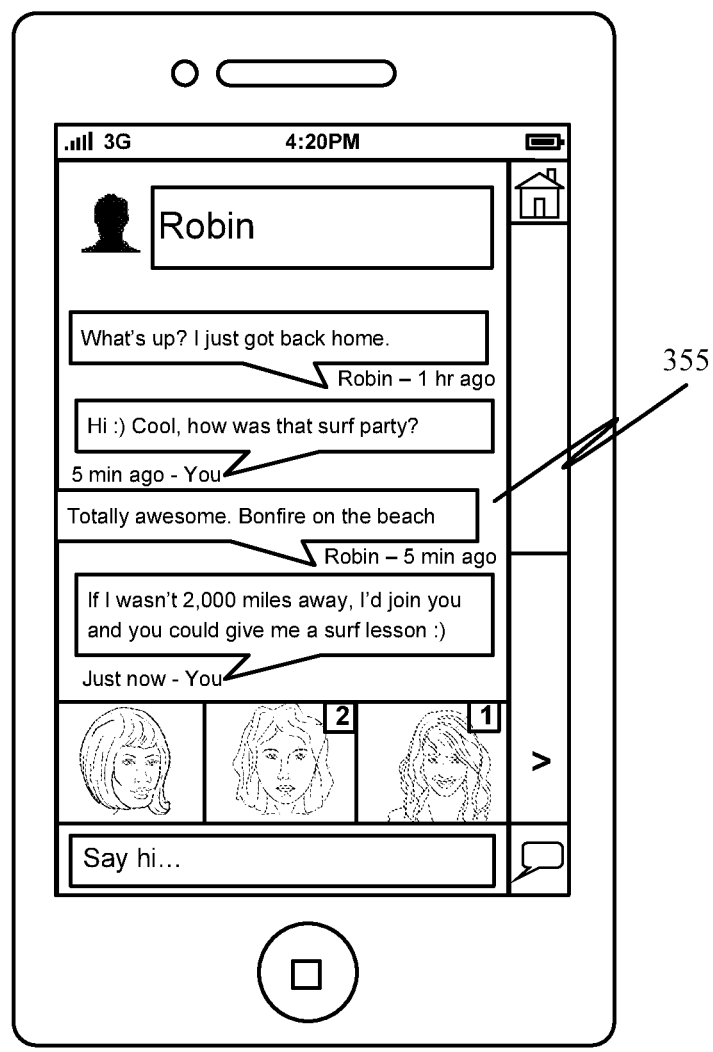

FIG. 12 and FIG. 13 illustrate the 'Datebook' feature provided by the dating platform of the present disclosure. The 'Datebook' feature allows the first user to chat with users with whom the first user has dated previously, as described in conjunction with FIG. 8 and FIG. 9 above. Further, as shown in FIG. 12, a user may be provided with different selectable options among the available users 340, 345 and 350 to chat with, among the different users connected to the dating server. On selecting a specific user, a live text chat session 355 or a real time video session is initiated between the first user and the selected user, as shown in FIG. 13.

Figure 14:
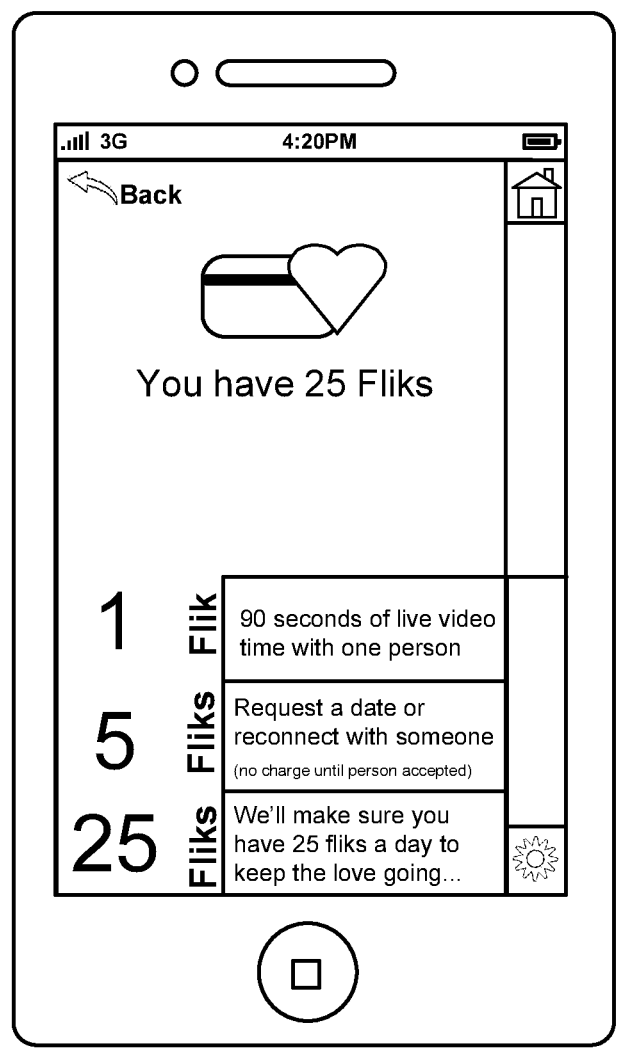

FIG. 14 shows a screenshot, showing a summary of a user's virtual currency account. As shown, the number of fliks remaining in the user's account appears on the top, with details of the amount of fliks to be charged for initiating different activities on the dating platform. For instance, as shown, a 90 second of live video chat costs 1 flik, request for a date costs 5 fliks and the account is credited with 25 fliks in every 24 hours.

Figure 15:

FIG. 15 shows a screenshot of the display screen as the user selects the 'about' option 235, illustrated in FIG. 2. As shown, simple and easily comprehensible messages, explain the benefits and friendly features of the dating platform to a user. As shown, such messages may include messages such as, "No Profiles, No waiting, no speed limits", "It's real time video dating on your term", etc.

Figure 16:
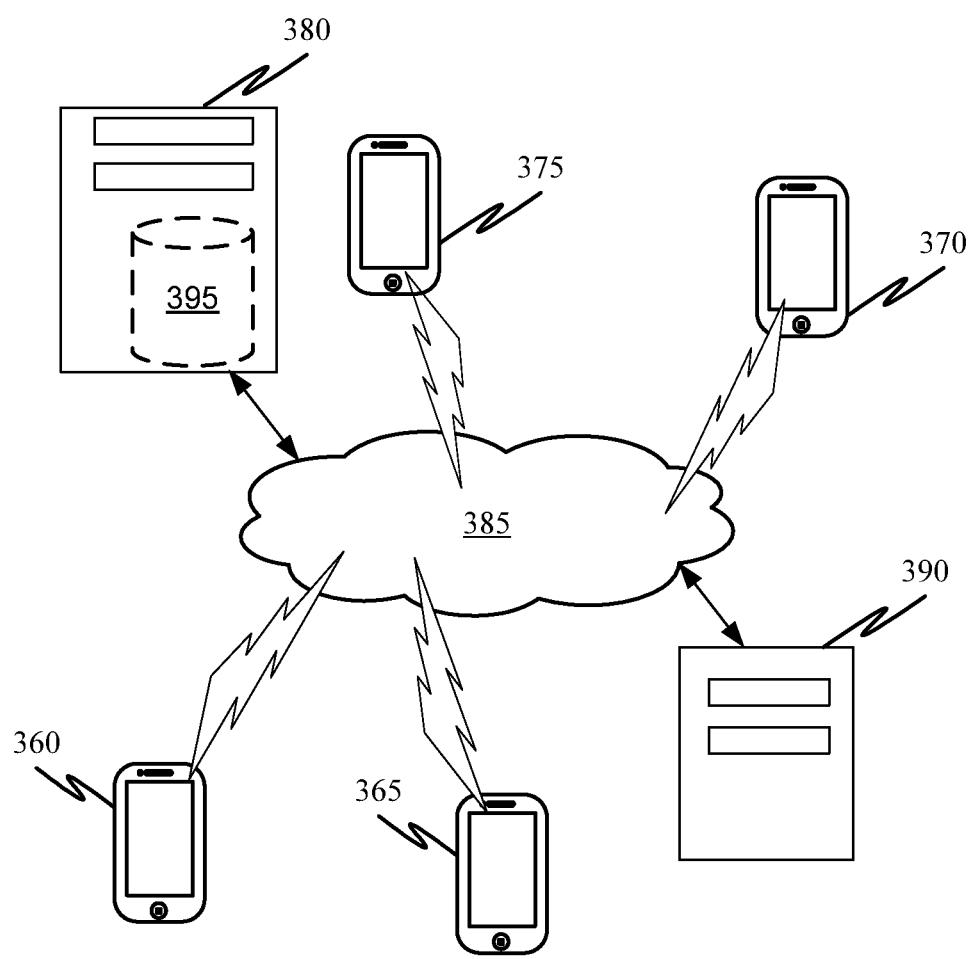
FIG. 16 illustrates an exemplary apparatus for facilitating a real time interactive video session of a predetermined duration between different users in a network, in accordance with the present disclosure.

FIG. 16 illustrates an exemplary environment for implementing the method and the system for facilitating a continuous succession of multiple real-time live interactive video sessions of a predetermined duration between two users in a plurality of users connected to a server through a network. The plurality of users use different electronic communication devices 360, 365, 370, and 375 etc., and they are logged on to a dating server 380 through a network 385. The electronic communication devices 360, 365, 370, and 375, etc., are each wireless mobile communication devices incorporating touch-screens, as noted above. The devices are smart communication devices based on a mobile operating system such as iOS®, Android®, BlackBerry OS®, and the like.

The user of electronic communication device 360 sends a message to the dating server 380 to determine an appropriate second user for a real time video session. The dating server 380 determines user of the electronic communication device 365 for real time video session between the electronic communication device 360 and the electronic communication device 365.

Here, the dating server excludes a set of users when matching the first user with an appropriate second user. Specifically, the server excludes users common between the users in a friends' list within a user account of the first user on the social networking platform; and the plurality of users connected to the dating server 380. The dating server 380 transmits contact information about the electronic communication device 365 to the electronic communication device 360, thereafter, the electronic communication device 360 initiates a real time video session with the second user using the electronic device 365. Further, debiting the user accounts corresponding to the electronic communication device 365 and the electronic communication device 360 by a predetermined amount of virtual currency, when a real time interactive video session is initiated between the users. Further, the devices interpret swiping operation and in consequence thereto, facilitate termination of the current video session and initiation of a new video session.

The users log into the dating server 380 using a smart phone application installed on the electronic communication devices 360, 365, 370, and 375 etc. The smart phone application renders a user interface on the electronic communication devices, facilitating the continuous succession of multiple real time interactive video sessions of a predetermined duration between two or more users among a plurality of users. The user interface includes the user selectable options, the first and the second virtual currency indicators and the common time indicator on the first and the second electronic communication devices. The user selectable options include an option to request for extending the duration of current video session beyond the predetermined duration, an option to request for a date, an option to provide rating to the other user, and an option to report inappropriate conduct. Further, the smart phone application initiates the real time video session between the users. Moreover, the smart phone application interprets user gestures on the touch screen and facilitates transmission of corresponding messages from the electronic communication device 360 to one of the dating server 380 and the another electronic communication device 365. Thereafter, the smart phone application installed on the electronic communication device 365 receives the messages and displays corresponding alerts on the display screen of the electronic communication device 365. The smart phone application installed on the electronic communication device 360 transmits messages to the electronic communication device 365 by embedding the messages in the real time video being transmitted from the electronic communication device 360 to the electronic device 365, the smart phone application installed on the electronic communication device 365 retrieves the embedded messages and displays corresponding alerts on the display screen of the electronic communication device 365.

Network 385 can be any suitable network to initiate connection of the devices to the dating server 272, including one or more of WiFi, Wireless Local Area Network (WLAN), Wireless 3G Network, Internet, etc. The dating server 380 is connected to, and synchronized with a server 390 pertaining to a social networking platform, which may be Facebook®, LinkedIn®, Google+®, Ning®, Twitter®, MySpace® and Orkut®. The dating server 380 uses an Application Programming Interface (API) provided by the social networking platform to connect to, and synchronize with, a server 390. For logging on to the server, the user of any of the electronic communication devices 360, 365, 370, and 375 etc. must provide his/her username and password details corresponding to an existing account of the user with the social networking platform that the server 390 belongs to. The smart phone application uses the API to log the user on to the dating server 380 using the username and password details corresponding to user account on the social networking platform. In an exemplary embodiment, the social networking platform is Facebook®, and the server 390 is the Facebook® server. As the users provides his/her Facebook® login details, the user gets connected to the dating server 380 without a need for the user to register and create an account at the dating server 380. The dating server 380 retrieves all the publicized details (or predetermined characteristics) of that user using Facebook API, and uses those details to match users for real time video sessions between users connected to the dating server 380.

The database 395 of the dating server 380 stores information pertaining to the different users of the dating platform. For example, the database 395 can store a list (for example, user identifications) of all the users previously banned through the 'perv-alert', and once a banned user tries to log on, the dating server recognizes the user identification and prevents the banned user from accessing the dating platform. Further, the database 395 may also store a community rating of different users, as explained earlier, and the dating server 380 uses these community ratings stored in the database 395 to find appropriate video dating matches for different users, when they request a video dating.

The method and the system of the present disclosure, for facilitating real time interactive video session between different users connected to a server through a network, through specifically described in context of a dating environment, however, is not limited in the scope of its application and implementation. For example, the method and the system may also be used to facilitate a real time video session between two users, where one user is an interviewer and the other is an interviewee, for instance, in context of a job vacancy.

Although the current invention has been described comprehensively, in considerable details to cover the possible aspects and embodiments, those skilled in the art would recognize that other versions of the invention may also be possible.

What is claimed is:

1. A method for facilitating a continuous succession of multiple real time interactive video sessions of a predetermined duration between two users in a plurality of users, the method comprising:
a first user using a first electronic communication device to log on to a server through a network;
the server matching a set of predetermined characteristics of the first user with a set of predetermined characteristics of one or more of the plurality of users, to determine an appropriate second user for the first user to interact with, the second user using a second electronic communication device to log on to the server using the network;
initiating the real time interactive video session of the predetermined duration between the first user and the second user;
rendering a first and a second virtual currency indicators on the display screens of the first and the second electronic communication devices, respectively, the first and the second virtual currency indicators representing remaining amount of virtual currency in a user account associated with the first user and the second user, respectively, wherein the virtual currency indicators are continuously updated with time;
interpreting one or more predetermined gestures of the first user and the second user on the first electronic communication device and the second electronic communication device, respectively, to perform one of:
terminating the current video session between the first user and the second user, and immediately initiating a next real time interactive video session for one or more of the first user and the second user, with other users in the plurality of users; and
increasing the duration of the current session beyond the predetermined duration and debiting the user account of the user that performed the predetermined gesture, by a predetermined amount of virtual currency;
terminating the current video session between the first user and the second user when the predetermined duration is over, and immediately initiating a next real time interactive video session for one or more of the first user and the second user, with other users in the plurality of users; and
debiting the user account of the first user and the second user by a predetermined amount of virtual currency, when a real time interactive video session is initiated between the two users.

2. The method of claim 1, further comprising rendering a common time indicator on the display screen of each of the first and the second electronic communication devices, at any instant the common time indicator representing a remaining time for the initiated video session.

3. The method of claim 1, wherein each of the first electronic communication device and the second electronic communication device is a smart communication device, using a mobile operating system, wherein the first user and the second user login to the server using an application installed on the first electronic communication device and the second electronic communication device.

4. The method of claim 3, wherein the application renders the real time video, the first and the second virtual currency indicators, the common time indicator and user selectable options on the display screens of the first electronic communication device and the second electronic communication device, the application further interprets the one or more predetermined gestures of the first user and the second user on the first electronic communication device and the second electronic communication device.

5. The method of claim 1, wherein the first user and the second user login to the server, using login details of their respective accounts on one or more social networking platforms.

6. The method of claim 5, wherein the server obtaining the predetermined characteristics of the user from user account on the social networking platform, the predetermined characteristics includes sex of the user, hobbies of the user and contact list of the user.

7. The method of claim 6, wherein the one or more social networking platforms includes Facebook®, LinkedIn®, Google+®, Ning®, Twitter®, MySpace® and Orkut®, wherein the server using Application Programming Interface (API) provided by the social networking platform to enable the user to login to the server using login details of the user account on the social networking platform, wherein the server obtaining the predetermined characteristics from user account on the social networking platform using the API.

8. The method of claim 5, further comprising, excluding a predetermined set of users, among the plurality of users, during performing the matching of the predetermined characteristics of the first user with the predetermined characteristics of other users in the plurality of users to determine an appropriate second user for the first user to interact with, wherein the predetermined set of users pertain to a certain category of contacts of the first user, and are obtained through the social networking platform.

9. The method of claim 1, wherein the set of predetermined characteristics of the first user includes a community rating of the first user, wherein the community rating of the first user is determined based on inputs pertaining to the first user, received from the other users among the plurality of users, the inputs being received during previous real time video sessions of the first user with the other users in the plurality of users, wherein the inputs are provided by the other users using the one or more predetermined gestures.

10. The method of claim 1, further comprising:
the first user sending a request to the second user for a date using the one or more predetermined gestures on the first electronic communication device; wherein:
on acceptance of the request by the second user, extending the current video session by a predetermined duration, debiting the user account of the first user by a predetermined amount of virtual currency and storing the contact information about the second user in the user account of the first user and vice versa, the contact information allows the first user and the second user to initiate a chat session at future point of time; and
on declination of the request by the second user, continuing the current video session.

11. The method of claim 1, wherein the first and the second electronic communication devices incorporate touch-sensitive display screens, and the one or more predetermined gestures include a swiping operation performed on the touch-sensitive display screen of any of the first and the second electronic communication devices, and a clicking or a tapping operation performed over a user selectable option rendered on the display screen of one of the first and the second electronic communication devices.

12. The method of claim 1, further comprising, rendering a user selectable option on the display screen of the first electronic communication device, for facilitating termination of a user account pertaining to the second user, based on identification of performing any predetermined forbidden action, by the second user.

13. The method of claim 12, further comprising, taking a screenshot of the display screen of the first electronic communication device, at the instant when the second user is identified to perform the predetermined forbidden action.

14. A method of claim 1, further comprising, crediting the user accounts of the first user and the second user with a specific pre-determined virtual currency periodically.

15. The apparatus of claim 1, wherein the real time video session is one of a dating session and a job interview session.

16. An apparatus for facilitating a continuous succession of multiple real-time live interactive video sessions of a predetermined duration between two users in a plurality of users connected to a server through a network, the apparatus comprising:
the server being configured to:
enable a first user in the plurality of users to log in to the server using login details of a user account of the first user on a social networking platform, the server using Application Programming Interface (API) provided by the social networking platform to enable the log in;
retrieve predetermined characteristics about the first user from the social networking platform using the API and storing the retrieved information at the server;
receive a request from a first user to identify an appropriate second user in the plurality of users for a real-time live interactive video session, the second user logged on the server using a second electronic communication device;
match a set of predetermined characteristics of the first user with a set of predetermined characteristics of one or more of the plurality of users, to identify the appropriate second user for a real-time live interactive video session with the first user, a set of predetermined characteristics further comprising a community rating received by each user in the plurality of users;
transmit contact information about the second user to the first electronic communication device;
the first electronic communication device configured to:
send a request to the server for finding the appropriate second user in the plurality of users for a real time interactive video session;
initiate a real time video session with the second user basis contact information received from the server about the appropriate second user;
the first and second electronic communication devices incorporating touch-sensitive display screens to obtain user inputs, the devices configured to interpret swiping operation thereon, and in consequence thereto, facilitate termination of the current video session and initiation of a new video session for one of the first user and the second user, based on the operation being performed by one of the first user and the second user, respectively,
the display screens on each of the devices rendering user selectable options to facilitate transmission of inputs received from a user of any of the first and the second electronic communication devices, to the user of the other of the first and the second electronic communication device, wherein, the user selectable options include:
an option to request for extending the duration of current video session beyond the predetermined duration; and
an option to request for a date;
an option to provide rating to the other user;
an option to report an inappropriate conduct;
the display screens of each of first and the second electronic communication devices also rendering:
a first and a second virtual currency indicators representing a current amount of virtual currency remaining in the user accounts associated with the users of the first and the second electronic communication device, respectively; and
a common time indicator representing a remaining amount of time for the current video session; and
debiting the user account of the first user and the second user by a predetermined amount of virtual currency, when a real time interactive video session is initiated between the users.

17. The apparatus of claim 16, wherein the first and the second electronic communication devices are smart communication devices, wherein the first user and the second user log into the server using a smart phone application installed on the first and the second electronic communication devices, wherein the smart phone application performs:

rendering a user interface on the first and the second electronic communication devices, facilitating the continuous succession of multiple real time interactive video sessions of a predetermined duration between two or more users among a plurality of users, wherein the user interface includes the user selectable options, the first and the second virtual currency indicators and the common time indicator on the first and the second electronic communication devices;

initiating the real time video session between the first user and the second user;

interpreting user gestures on the touch screen and facilitating transmission of corresponding messages from the first electronic communication device to one of the server and the second electronic communication device; and receiving the messages at the second electronic communication device and displaying corresponding alerts on the display screen of the second electronic communication device.

18. The apparatus of claim 16, wherein the transmission of corresponding messages from the first electronic communication device to the second electronic communication device is performed by embedding the messages in the real time video being transmitted from the first electronic communication device to the second electronic communication device, the second electronic communication device retrieves the embedded messages and displays corresponding alerts on the display screen of the second electronic communication device.

19. The apparatus of claim 16, wherein, on selection of the user selectable option by the first user to report an inappropriate conduct, one of the first electronic communication device and the server is further configured to take a screenshot of the display screen of the first electronic communication device, wherein the first electronic communication device transmits the screenshot to the server.

20. The apparatus of claim 16, the server further configured to exclude a set of users during matching the appropriate second user for the first user to interact with, the server exclude users common between:

the users in a friends' list within a user account of the first user on the social networking platform; and the plurality of users connected to the server through the network.

\* \* \* \* \*